(12) United States Patent
Jau et al.

(10) Patent No.: US 9,037,879 B2
(45) Date of Patent: May 19, 2015

(54) RACK SERVER SYSTEM HAVING BACKUP POWER SUPPLY

(75) Inventors: Maw-Zan Jau, Taipei (TW); Tzu-Hung Wang, Keelung (TW); Chin-Hsiang Chan, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 414 days.

(21) Appl. No.: 13/409,186

(22) Filed: Mar. 1, 2012

(65) Prior Publication Data

US 2013/0031381 A1   Jan. 31, 2013

(30) Foreign Application Priority Data

Jul. 28, 2011 (TW) ............................... 100126879

(51) Int. Cl.
*G06F 1/00* (2006.01)
*G06F 1/30* (2006.01)
*H02J 7/00* (2006.01)

(52) U.S. Cl.
CPC ............... *G06F 1/305* (2013.01); *H02J 7/0057* (2013.01)

(58) Field of Classification Search
CPC ............................... G06F 1/305; H02J 7/0057
USPC .......................................................... 713/300
See application file for complete search history.

(56) References Cited

U.S. PATENT DOCUMENTS

| | | | |
|---|---|---|---|
| 5,565,759 A | 10/1996 | Dunstan | |
| 6,288,520 B1 | 9/2001 | Kim | |
| 6,317,657 B1 * | 11/2001 | George | 700/286 |
| 6,601,181 B1 * | 7/2003 | Thomas | 713/340 |
| 8,229,758 B2 * | 7/2012 | Moncrease | 705/2 |
| 2001/0017485 A1 * | 8/2001 | Yoo | 307/66 |
| 2002/0065998 A1 * | 5/2002 | Buckland | 711/162 |
| 2005/0120251 A1 * | 6/2005 | Fukumori | 713/300 |
| 2006/0212272 A1 * | 9/2006 | James | 702/188 |
| 2008/0030078 A1 | 2/2008 | Whitted et al. | |
| 2009/0243391 A1 * | 10/2009 | Susong et al. | 307/66 |
| 2010/0280669 A1 * | 11/2010 | Wycoff et al. | 700/282 |
| 2010/0299548 A1 * | 11/2010 | Chadirchi et al. | 713/340 |
| 2011/0166714 A1 * | 7/2011 | Stachnik | 700/282 |

FOREIGN PATENT DOCUMENTS

| | | |
|---|---|---|
| CN | 2458802 | 11/2001 |
| CN | 200990515 Y | 12/2007 |
| CN | 201207584 | 3/2009 |
| JP | 10-336912 | 12/1998 |

(Continued)

OTHER PUBLICATIONS

English abstract for CN200990515; published on Dec. 12, 2007.

(Continued)

*Primary Examiner* — Mohammed Rehman
(74) *Attorney, Agent, or Firm* — Novak Druce Connolly Bove + Quigg LLP

(57) ABSTRACT

A rack server system including at least one server and a battery backup unit (BBU) is provided. A power supplier is coupled to the server for converting an input voltage into a first output voltage when the input voltage is normal and for providing the first output voltage to the server. The BBU is coupled to the server and the power supplier for detecting the first output voltage outputted from the power supplier and for providing a second output voltage to the server when the input voltage and/or the first output voltage are abnormal.

20 Claims, 2 Drawing Sheets

(56) References Cited

FOREIGN PATENT DOCUMENTS

| | | |
|---|---|---|
| JP | 11-318038 | 11/1999 |
| JP | 2010-088211 A | 4/2010 |
| TW | 200803113 | 1/2008 |

OTHER PUBLICATIONS

Office Action mailed Aug. 29, 2014; in corresponding Chinese patent application No. 201110247499.2.

Office Action mailed Jul. 28, 2014; in corresponding Taiwanese patent application No. 200803113.

English abstract for CN201207584; published on Mar. 11, 2009 and retrieved on Oct. 20, 2014.

English abstract for CN2458802; published on Nov. 7, 2001 and retrieved on Oct. 20, 2014.

English abstract for TW200803113; published on Jan. 1, 2008 and retrieved on Oct. 20, 2014.

* cited by examiner

RACK SERVER SYSTEM HAVING BACKUP POWER SUPPLY

This application claims the benefit of Taiwan application Serial No. 100126879, filed Jul. 28, 2011, the subject matter of which is incorporated herein by reference.

TECHNICAL FIELD

The disclosure relates in general to a rack server system and more particularly to a rack server system with back-up battery unit (BBU).

BACKGROUND

Blade servers have been widely used in various applications. A rack server system includes blade servers in a rack system for convenience of operation.

A blade server of the rack server system functions as a computer with complete functions. In other words, a blade server has peripheral devices such as a power supplier and a heat dissipation device in addition to its core components (such as CPU, motherboard, random access memory (RAM) and hard disc).

If AC-grid power is unstable, operations of the server will be unstable (such as shut-down) and data stored in the server may even be damaged. An uninterruptible power system (UPS) is used to avoid data loss and damage to electronic apparatus if power supply is abnormal, so as to effectively protect internal elements of the server and assure lifespan and accuracy of the server. However, reliability of existing UPS is still not satisfactory.

So, a battery backup unit (BBU) is in the rack server system to replace/assist the UPS for low cost, high efficiency and high stability. However, it is important how and when the BBU identifies that the AC-grid power becomes interruptible/unstable so as to timely provide power to the rack server system.

When the AC-grid power is normally supplied, an AC/DC power supplier provides power to the rack server system for charging the BBU. When the AC-grid power becomes interruptible/unstable, the AC/DC power supplier stops providing the power and notifies the BBU, so that the BBU provides power to maintain normal operations of the rack server system. Therefore, to avoid the rack server system being affected by unstableness/interruption of the AC-grid power, the change of power supply source (from the AC/DC power supplier to the BBU) shall never be interrupted.

However, the current BBU technology still has the following technology disadvantages:

Firstly, the AC/DC power supplier detects whether the AC-grid power is interruptible/unstable but the BBU does not have any AC-grid power detection circuit. When the AC-grid power becomes interruptible/unstable, the rack server system will fail if the AC/DC power supplier cannot correctly notify the BBU.

Secondly, even to include an AC-grid power detection circuit in the BBU, the detection of the AC-grid power is not easy because the AC-grid power is normally in cosine waves and the detection circuit may easily end up with erroneous detection.

Thirdly, even if the AC-grid power is not detected by the BBU and the BBU and the rack server system are directly connected in parallel, the power supplied by the BBU is usually inefficient and makes the rack server system inefficient accordingly. Besides, if power storage in the BBU is insufficient, the rack server system would fail when the AC-grid power becomes interruptible/unstable.

Therefore, the disclosure provides a rack server system and a BBU thereof for improving the shortcomings of the current technologies.

SUMMARY OF THE DISCLOSURE

The disclosure is directed to a rack server system and a battery backup unit (BBU) thereof which provide power to the server, and BBU does not detect whether the AC-grid power is normal.

According to an exemplary embodiment the present disclosure, a rack server system including at least one server and a battery backup unit (BBU) is provided. A power supplier is coupled to the server for converting an input voltage into a first output voltage when the input voltage is normal and for providing the first output voltage to the server. The BBU is coupled to the server and the power supplier, for detecting the first output voltage outputted from the power supplier and for providing a second output voltage to the server when the input voltage and/or the first output voltage are abnormal.

It is to be understood that both the foregoing general description and the following detailed description are exemplary and explanatory only and are not restrictive of the disclosed embodiments, as claimed.

DETAILED DESCRIPTION OF THE DISCLOSURE

Figure 1:
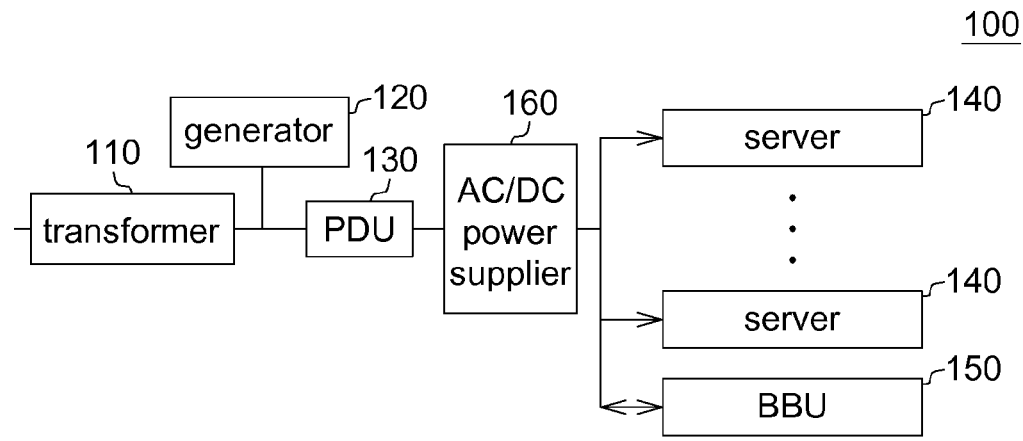
FIG. 1 shows a functional diagram of a rack server system according to one embodiment of the disclosure.

FIG. 1 shows a functional diagram of a rack server system according to one embodiment of the disclosure. As indicated in FIG. 1, the rack server system 100 includes a transformer 110, a generator 120, a power distribution unit (PDU) 130, an alternate current (AC)/direct current (DC) power supplier 160, at least one server 140 and a battery backup unit (BBU) 150. The numbers of the server 140 and the BBU 150 are not restricted here. The numbers, functions and operations of the transformer 110, the generator 120, the power distribution unit 130, and the AC/DC power supplier 160 are not restricted in the present embodiment of the disclosure.

In the present embodiment of the disclosure, if the AC-grid power becomes interruptible/unstable, the BBU 150 provides power to the servers 140. Then, the generator 120 is activated for generating and providing AC power to the AC/DC power supplier 160, which converts AC power into DC power and further provides the DC power to the servers 140. That is, in the present embodiment of the disclosure, the period during which the BBU 150 provides power basically covers from the time when it detects the AC-grid power is unstable to the time when the generator 120 is normally activated.

Figure 2:
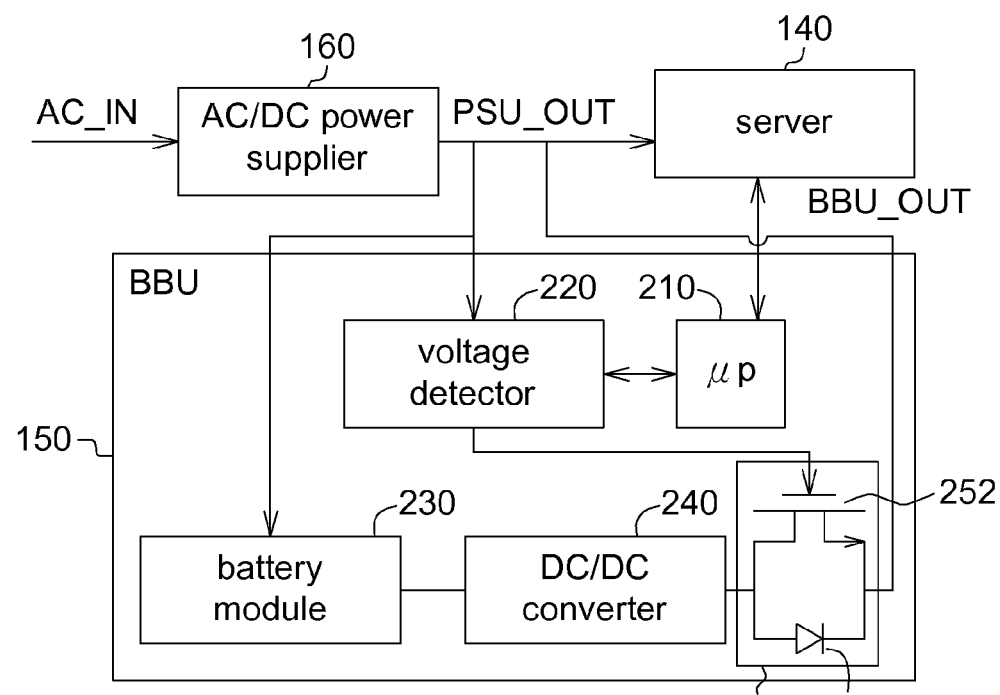
FIG. 2 shows a block diagram of a BBU according to one embodiment of the disclosure.

Referring to FIG. 2, a block diagram of the BBU 150 according to one embodiment of the disclosure is shown. As indicated in FIG. 2, the BBU 150 includes a micro-controller 210, a voltage detector 220, a battery module 230, a DC/DC converter 240 and a blocking circuit 250.

When the AC-grid power AC_IN is normal, power of the server 140 is provided by the AC/DC power supplier 160 in the rack server system 100. As an exemplification of the disclosure, the AC/DC power supplier 160 outputs a 12.3V DC voltage PSU_OUT, but the disclosure is not limited thereto.

When the AC-grid power AC_IN is abnormal/unstable/interruptible, the DC voltage PSU_OUT outputted from the AC/DC power supplier 160 drops under its default value. When the voltage detector 220 detects that the DC voltage PSU_OUT is lower than a threshold (such as but not limited to 12V and adjustable), the voltage detector 220 notifies the micro-controller 210.

In the present embodiment of the disclosure, the battery module 230 and the DC/DC converter 240 are basically in a normal operation status no matter the AC-grid power AC_IN is normal or not. Besides, when the AC-grid power AC_IN is normal, the battery module 230 may further be charged by the DC voltage PSU_OUT outputted from the AC/DC power supplier 160.

The blocking circuit 250 is used as a switch for conducting or blocking the output DC voltage of the BBU 150 to/from the server. As an exemplification, the blocking circuit 250 includes a redundant diode circuit, but the disclosure is not limited thereto. For example, the blocking circuit 250 may include a logic circuit, an electronic or mechanic switch or a relay or any combination thereof, and that is within the spirit of the disclosure. As an exemplification indicated in FIG. 2, the blocking circuit 250 includes a redundant diode 251 and an NMOS transistor 252 connected in parallel. The diode 251 is coupled between the DC/DC converter 240 and the AC/DC power supplier 160. The NMOS transistor 252 has a gate coupled to the voltage detector 220, a drain coupled to the DC/DC converter 240, and a source coupled to the AC/DC power supplier 160.

When the AC-grid power is normal, the DC voltage PSU_OUT has a normal value higher than the DC voltage outputted from the DC/DC converter 240. Thus, the diode 251 of the blocking circuit 250 is not turned on. The voltage detector 220 controls the NMOS transistor 252 as OFF. That is, when the AC-grid power is normal, the blocking circuit 250 is not in conduction.

However, when the AC-grid power AC_IN is abnormal/unstable/interruptible, the DC voltage PSU_OUT outputted from the AC/DC power supplier 160 drops or vanishes. When a voltage difference between the DC voltage outputted from the DC/DC converter 240 and the DC voltage PSU_OUT outputted from the AC/DC power supplier 160 is larger than a threshold (such as 0.3V), the diode 251 is turned on, and the DC voltage outputted from the DC/DC converter 240 is outputted as a DC voltage BBU_OUT through the diode 251 and provided to the server 140. Despite the diode 251 may drop the DC voltage BBU_OUT, the DC voltage BBU_OUT still reaches a desired voltage level for the server 140.

When the voltage detector 220 detects that the DC voltage PSU_OUT drops, the voltage detector 220 controls the NMOS transistor 252 to be turned on. The voltage drop of the NMOS transistor 252 is smaller than that of the diode 251, so the DC voltage outputted from the DC/DC converter 240 is outputted as the DC voltage BBU_OUT through the NMOS transistor 252 and flows to the server 140.

When the AC-grid power AC_IN resumes normal, the DC voltage PSU_OUT also resumes normal. When the voltage detector 220 detects that the DC voltage PSU_OUT resumes normal, the voltage detector 220 turns off the NMOS transistor 252 to avoid a current returning back to the BBU 150.

When one or more internal elements of the BBU 150 (such as the DC/DC converter 240) is/are failed, due to the server is protected by the blocking circuit 250, the server 140 is not affected. Besides, even when the DC voltage PSU_OUT outputted from the AC/DC power supplier 160 surges abruptly, the surge DC voltage is blocked by the blocking circuit 250 and does not affect the BBU 150.

Figure 3A:
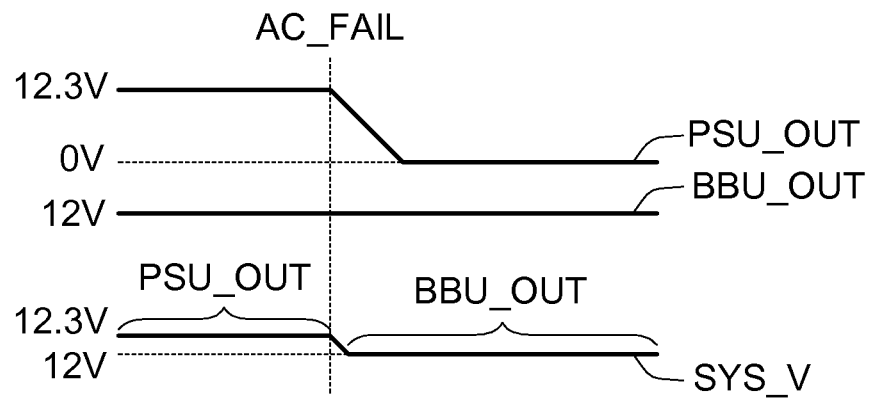
FIG. 3A and FIG. 3B show output DC voltages from an AC/DC power supplier and from the BBU.
Figure 3B:
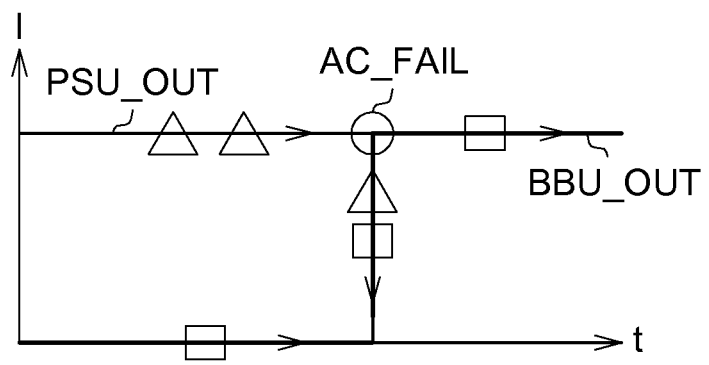

FIG. 3A and FIG. 3B show the output DC voltage of the AC/DC power supplier and the output DC voltage of the BBU. "AC_FAIL" denotes that the AC-grid power is interrupted. Before the AC-grid power interruption AC_FAIL occurs, a voltage (SYS_V) required by the server 140 is provided by the DC voltage PSU_OUT outputted from the AC/DC power supplier 160. Despite the DC/DC converter 250 keeps providing the DC output voltage DC_OUT, the DC output voltage DC_OUT is blocked by the blocking circuit 250 and is not outputted to the server. When the AC-grid power interruption AC_FAIL occurs, the DC current/voltage outputted from the AC/DC power supplier 160 drops gradually toward 0, and the DC voltage BBU_OUT outputted from the BBU provides a current/voltage to the server 140 lest the operation of the server 140 might be affected, wherein the DC voltage BBU_OUT outputted from the BBU is provided by the DC/DC converter 250 and dropped by the blocking circuit 250.

Exemplarily but not restrictively, in the present embodiment of the disclosure, a small-size lithium battery is used as an energy storage device of the battery module 230 to reduce the size of the BBU. In addition, the BBU is disposed in the rack server system to reduce energy loss in transmission. Moreover, the BBU uses the rack and bus signal lines of the rack server system and does not require its own dedicated rack, so BBU cost is reduced. Furthermore, the BBU detects the voltage change of the server and automatically judges whether to output the voltage (i.e. provide power) to the server.

As disclosed above, the BBU includes a voltage detector and a micro-controller and thus automatically judges whether to output the voltage to the server.

In the present embodiment of the disclosure, given that the voltage outputted from the AC/DC power supplier is 12.3V and that the DC voltage outputted from the BBU is 12V, the voltage difference is 0.3V, such that the likelihood of erroneous operation of the blocking circuit 250 may further be reduced.

In other possible embodiments of the disclosure, the BBU may also receive a power abnormal indication signal provided by the AC/DC power supplier to enhance system stability. When the AC-grid power is interrupted, the AC/DC power supplier outputs the power abnormal indication signal to the BBU. In addition, the BBU may pass its own status to the rack server system through a communication interface.

In the present embodiment of the disclosure, the BBU detects DC voltage, that is, the BBU does not detect AC voltage, so the configuration of the BBU is made simpler and the likelihood of erroneous actions is reduced. As disclosed above, the normal DC voltage outputted from the AC/DC power supplier is higher than the normal DC voltage outputted from the BBU. The BBU does not output voltage when the AC-grid power is normal. When the BBU detects that the DC voltage outputted from the AC/DC power supplier is normal, the BBU is charged by the AC/DC power supplier (that is, the BBU is in a charge stand-by mode). Once the DC voltage outputted from the AC/DC power supplier is lower than the DC voltage outputted from the BBU (that is, the AC-grid power is interrupted), the BBU outputs a current to the rack server system to maintain the efficiency and stability of the rack server system.

Moreover, whether the BBU output a voltage to the server is judged by the blocking circuit of the BBU. Once the DC voltage outputted from the AC/DC power supplier is low, the BBU outputs a current to the server. The BBU of the present embodiment of the disclosure may be connected in parallel with different types of the rack server system.

The present embodiment of the disclosure has the following features. The BBU provides power to the server timely and the BBU does not detect whether the AC-grid power is normal. Since what the BBU detects is DC voltage, the associated voltage detection technology is easy to be implemented. For the AC/DC power supplier, since there is no need to detect whether the AC-grid power is interrupted, an ordinary backup AC/DC power supplier would be applicable in the embodiment of the application. The internal control loop of the BBU has high stability.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A rack server system, comprising:
   at least one server;
   a power supplier coupled to the server for converting an input voltage into a first output voltage and providing the first output voltage to the server when the input voltage is normal; and
   a battery backup unit (BBU) coupled to the server and the power supplier for detecting the first output voltage outputted from the power supplier and providing a second output voltage to the server when the input voltage or the first output voltage are abnormal, the BBU comprising:
      a voltage detector for detecting the first output voltage outputted from the power supplier, and a blocking circuit coupled to the voltage detector, the blocking circuit comprising a diode and a switch, the diode coupled to the power supplier, the switch controlled by the voltage detector;
      wherein the diode is configured to be off when the input voltage is normal and the voltage detector is configured to keep the switch off when the input voltage is normal, whereby the blocking circuit is turned off when the input voltage is normal.

2. The rack server system according to claim 1, wherein the BBU further comprises:
   a micro-controller coupled to the voltage detector;
   a battery module coupled to the power supplier;
   a converter coupled to the battery module; and
   wherein the blocking circuit is coupled to the converter wherein the blocking circuit is turned on when the input voltage is abnormal/unstable/interruptible.

3. The rack server system according to claim 2, wherein,
   when the input voltage is abnormal/unstable/interruptible, the first output voltage outputted from the power supplier drops under a default value;
   the voltage detector notifies the micro-controller when the voltage detector detects that the first output voltage drops under a first threshold.

4. The rack server system according to claim 3, wherein the switch comprises an NMOS transistor connected in parallel with the diode, wherein the diode is coupled between the power supplier and the converter, and wherein the NMOS transistor is controlled by the voltage detector; and
   wherein the input voltage is normal when the first output voltage is higher than an output voltage of the converter.

5. The rack server system according to claim 4, wherein,
   when the input voltage is abnormal/unstable/interruptible, the first output voltage drops, such that the diode is turned on, and the output voltage of the converter is outputted as the second output voltage through the diode and flows to the server; and
   when the voltage detector detects that the first output voltage drops as or under than the first threshold, the voltage detector controls the NMOS transistor to be turned on, such that the output voltage of the converter is outputted as the second output voltage through the NMOS transistor and flows to the server.

6. The rack server system according to claim 2, wherein, the battery module comprises a lithium battery.

7. The rack server system according to claim 2, wherein, the power supplier charges the battery module when the input voltage is normal.

8. The rack server system according to claim 1, wherein,
   the BBU receives a power abnormal indication signal provided by the power supplier, and when the input voltage is abnormal/unstable/interruptible, the power supplier outputs the power abnormal detection signal to the BBU; and
   the BBU sends its status to the server through a communication interface.

9. The rack server system according to claim 1, further comprising a generator, wherein when the input voltage is unstable/interruptible, the generator is activated for generating and providing power to the power supplier.

10. A rack server system, comprising:
    at least one server;
    a power supplier coupled to the server for converting an input voltage into a first output voltage and providing the first output voltage to the server when the input voltage is normal; and
    a battery backup unit (BBU) coupled to the server and the power supplier for detecting the first output voltage outputted from the power supplier and providing a second output voltage to the server when the input voltage and/or the first output voltage are abnormal, the BBU comprising:
       a voltage detector for detecting the first output voltage outputted from the power supplier;
       a blocking circuit coupled to the voltage detector, the blocking circuit comprising a diode and a switch, the diode coupled to the power supplier, the switch controlled by the voltage detector, wherein the diode is configured to be off when the input voltage is normal and the voltage detector is configured to keep the switch off when the input voltage is normal, whereby the blocking circuit is turned off when the input voltage is normal;
       a micro-controller coupled to the voltage detector;
       a battery module coupled to the power supplier; and
       a converter coupled to the battery module;
    wherein the blocking circuit is coupled to the converter wherein the blocking circuit is turned on when the input voltage is abnormal/unstable/interruptible.

11. The rack server system according to claim 10, wherein,
    when the input voltage is abnormal/unstable/interruptible, the first output voltage drops, such that the diode is turned on, and the output voltage of the converter is outputted as the second output voltage through the diode and flows to the server; and
    when the voltage detector detects that the first output voltage drops as or under than the first threshold, the voltage detector controls the switch to be turned on, such that the output voltage of the converter is outputted as the second output voltage through the switch and flows to the server.

12. The rack server system according to claim 10, wherein, the battery module comprises a lithium battery.

13. The rack server system according to claim 10, wherein, the BBU receives a power abnormal indication signal provided by the power supplier, and when the input voltage is abnormal/unstable/interruptible, the power supplier outputs the power abnormal detection signal to the BBU; and the BBU sends its status to the server through a communication interface.

14. The rack server system according to claim 10, wherein, the power supplier charges the battery module when the input voltage is normal.

15. The rack server system according to claim 10, further comprising a generator, wherein when the input voltage is unstable/interruptible, the generator is activated for generating and providing power to the power supplier.

16. The rack server system according to claim 10, further comprising a generator, wherein when the input voltage is unstable/interruptible, the generator is activated for generating and providing power to the power supplier.

17. A rack server system, comprising:
at least one server;
a power supplier coupled to the server for converting an input voltage into a first output voltage and providing the first output voltage to the server when the input voltage is normal; and
a battery backup unit (BBU) coupled to the server and the power supplier for detecting the first output voltage outputted from the power supplier and providing a second output voltage to the server when the input voltage and/or the first output voltage are abnormal, the BBU comprising:
a voltage detector for detecting the first output voltage outputted from the power supplier;
a blocking circuit coupled to the voltage detector, the blocking circuit comprising a diode and a MOS transistor, the diode coupled to the power supplier, the MOS transistor controlled by the voltage detector, wherein the diode is configured to be off when the input voltage is normal and the voltage detector is configured to keep the MOS transistor off when the input voltage is normal, whereby the blocking circuit is turned off when the input voltage is normal;
a micro-controller coupled to the voltage detector;
a battery module coupled to the power supplier; and
a converter coupled to the battery module;
wherein the blocking circuit is coupled to the converter wherein the blocking circuit is turned on when the input voltage is abnormal/unstable/interruptible.

18. The rack server system according to claim 17, wherein, when the input voltage is abnormal/unstable/interruptible, the first output voltage drops, such that the diode is turned on, and the output voltage of the converter is outputted as the second output voltage through the diode and flows to the server; and when the voltage detector detects that the first output voltage drops as or under than the first threshold, the voltage detector controls the MOS transistor to be turned on, such that the output voltage of the converter is outputted as the second output voltage through the MOS transistor and flows to the server.

19. The rack server system according to claim 17, wherein, the BBU receives a power abnormal indication signal provided by the power supplier, and when the input voltage is abnormal/unstable/interruptible, the power supplier outputs the power abnormal detection signal to the BBU; and the BBU sends its status to the server through a communication interface.

20. The rack server system according to claim 17, wherein, the power supplier charges the battery module when the input voltage is normal.

\* \* \* \* \*